Dec. 20, 1955   E. P. COLBY   2,727,327
THREE-DIMENSIONAL PICTOGRAPHS AND METHOD OF PRODUCING SAME
Filed Aug. 2, 1954   2 Sheets-Sheet 1

INVENTOR.
EDWARD P. COLBY
BY
ATTORNEY

Dec. 20, 1955  E. P. COLBY  2,727,327
THREE-DIMENSIONAL PICTOGRAPHS AND METHOD OF PRODUCING SAME
Filed Aug. 2, 1954  2 Sheets-Sheet 2

INVENTOR.
EDWARD P. COLBY
BY
ATTORNEY

United States Patent Office 2,727,327
Patented Dec. 20, 1955

2,727,327

THREE-DIMENSIONAL PICTOGRAPHS AND METHOD OF PRODUCING SAME

Edward P. Colby, Escondido, Calif.

Application August 2, 1954, Serial No. 446,995

11 Claims. (Cl. 41—21)

My invention relates to three-dimensional pictographs produced by depressed carving and coloring within the rear wall portions of a thick sheet or sheets of crystal clear acrylic plastic or other transparent material which form a complete picture, when combined and viewed from the front; and its objects are to create three-dimensional stereoscopic illusion through the artistic carving of objects located apart or superimposed one upon the other and differentiated by color within the rear portions of said sheet or sheets of material; to augment said illusion through the stacking of said sheets of material so carved upon a dark backing sheet to form a complete picture; to produce a picture in which parts thereof are developed on separate transparent sheets superimposed to create said illusion; and in general to produce in a simple manner through superimposed images or objects carved within the body of a transparent pane or panes of sheet material the tactile illusion of a natural scene.

I am aware that it is old in the art to produce three-dimensional pictures through the stacking of sheets or layers of transparent glass upon one face of each of which colored parts of the picture are painted, and which when stacked and viewed as a whole produce the illusion of a composite entity; but it is my belief that I am the first person in the art to produce three-dimensional stereoscopic effects by reversed depth superimposed carvings of a thick sheet of methyl methacrylate, in the form commonly known as "Plexiglas" or "Lucite," the optical properties of which are different from ordinary glass, and the refraction of which allows light to be transferred from the source around obstructions to the place where it is needed, and the light emission of which at cut surfaces produces a marked luminous effect. I have discovered that by taking a sheet of Plexiglas one quarter of an inch in thickness, and by carving in reverse the back wall portion of the same to an appreciable depth to form a background, and then, upon such background, carving such portion still more deeply to represent an object in front of said background and extending forwardly thereof, particularly where characteristic coloring is employed, a surprisingly life-like novel effect in three dimensions is brought about when the said sheet is viewed from the front, particularly when illuminated against a dark backing sheet.

Attention is hereby directed to the accompanying drawing illustrating a number of preferred forms of my invention in which similar numerals of designation refer to similar parts throughout the several views, and in which—

Figure 1:
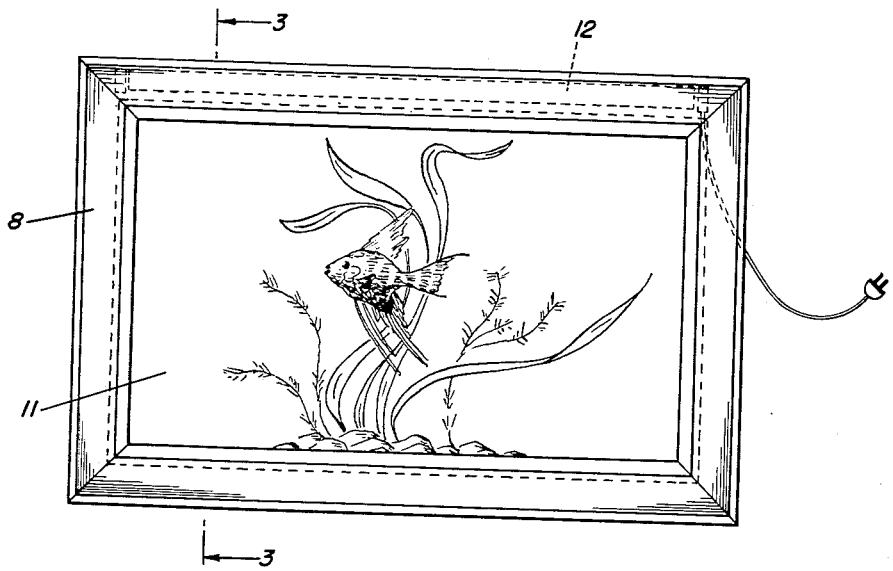
Figure 1 is a view of a complete pictograph viewed from the front, and resulting from the superimposed deep carvings of the rear wall portion or portions of the sheet or sheets of transparent material against a dark backing sheet.
Figure 2:
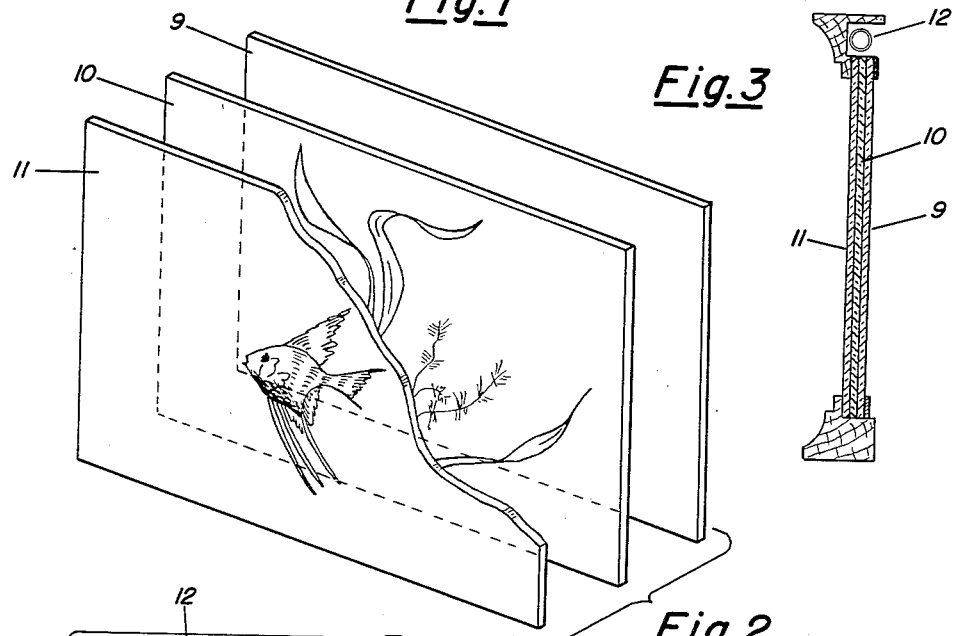
Fig. 2 is an isometric view of separate sheets of transparent material each of which is deeply carved from the back and each displaying a part of the picture, which sheets when superimposed in front of a dark backing sheet and viewed from the front make up the complete pictograph.
Figure 3:
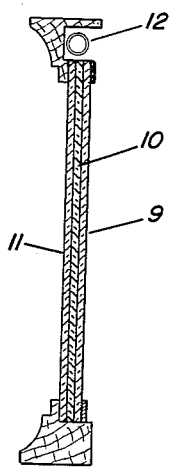
Fig. 3 is a section on line 3—3 of Fig. 1, looking in the direction indicated by the arrows.
Figure 4:
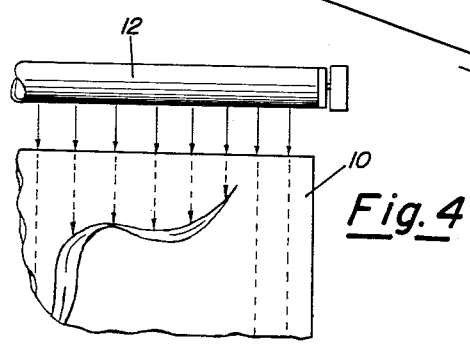
Fig. 4 is a detail view showing the means provided for the illumination of the pictograph.

Referring to the drawing, the multiple sheet form of my pictograph shown in Figs. 1 to 4 comprises the frame 8, the opaque backing sheet 9, transparent sheets 10 and 11, and the lighting device 12.

The sheets 10 and 11 are preferably thick sheets of Plexiglas, Lucite or other forms of methyl methacrylate, but may be of any transparent suitable material and of any desired number. The back of each of these sheets is deeply carved in reverse with a part of the picture to be developed, in order to obtain the benefit of the luminous effect of the cut surfaces thereof, particularly where acrylic plastics are used, and the sheets are superimposed to enhance the three-dimensional effects of the objects shown thereon; the backs of the lower sheets preferably being carved in reverse to represent the background features of the picture in whole or in part, the remaining or more dominant features being carved in reverse in the backs of the sheets to the front. Also, the said carvings should be painted with oil or plastic dyes in contrasting colors to furnish realism to the objects so depicted. To enhance said luminous effects the opaque backing sheet 9 is supplied, and all of the sheets are superimposed and cemented together to give the impression of a unified pictograph with the carved and painted objects standing forth therein in life-like three-dimensional appearance. Preferably the combined sheets are mounted in a frame 8, and light to the picture is supplied from above by the fluorescent light 12 using edge-lighting means, or such light could be furnished by any other lighting means well known in the art.

Figure 5:
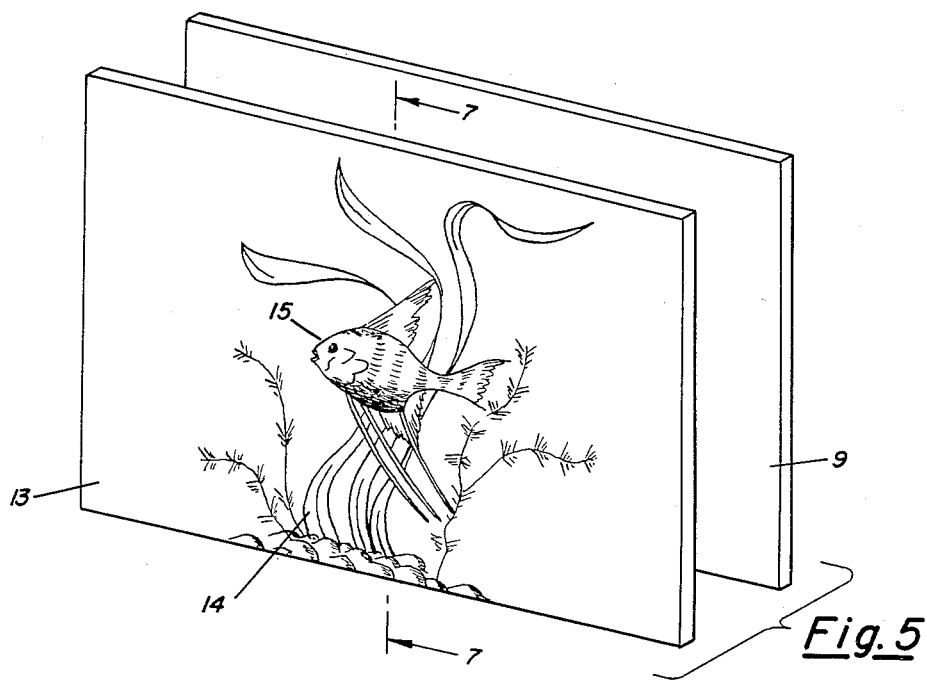
Fig. 5 is an isometric view of a single sheet of thick transparent material, the back portion of which has been carved at a substantial depth to represent the background, and the background of which has been more deeply carved to represent an object superimposed thereon, the said sheet being accompanied by an opaque backing sheet upon which it normally rests.
Figures 6, 7:
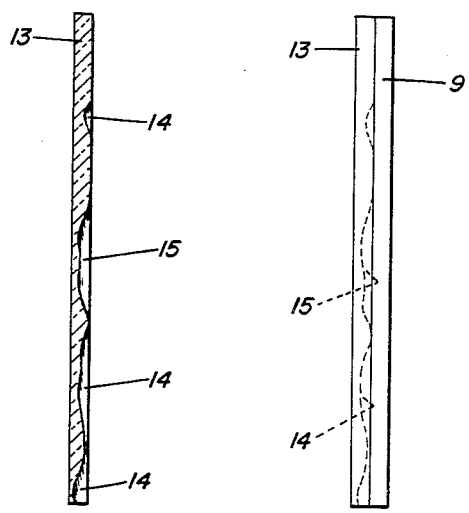
Fig. 6 is a section of the sheets shown in Fig. 5 when in assembled relation.
Fig. 7 is a detail view of the depth carvings of the transparent sheet shown in Fig. 5, showing the imposition of the carvings thereon.

In Figs. 5 to 7, I have embodied my invention in a single thick sheet 13 of transparent material, preferably Plexiglas or Lucite one quarter of an inch or more in thickness. Working from the back of said sheet, I deeply carve in reverse the background or supplemental parts of the picture, and upon said background or in addition to said parts, I still more deeply carve in reverse said sheet to depict in depressed relief the dominant feature thereof superimposed upon the carvings already thereon. Thus, in Figs. 5 to 7, I have shown carved in reverse for a background the seaweed plant 14, and deeply carved in reverse and superimposed upon said background I have shown the fish 15; the effect produced, upon the pictograph being viewed from the front, that the said fish appears to be floating in water before said plant in three-dimensional form, particularly if the said sheet 13 is mounted upon a dark backing sheet 9, and lighted as shown in Figs. 1 to 4.

While I prefer to color the carved parts of the picture as hereinbefore set forth, I have found that even where color is entirely dispensed with, stereoscopic effects of an artistic nature may still be produced, which effects I believe to be within the scope of my invention and covered thereby.

My invention may be embodied in other specific forms without departing from the spirit or essential characteristics thereof. The present embodiment as above set forth is therefore to be considered in all respects as illustrative and not restrictive, the scope of my invention being indicated by the appended claims rather than by the foregoing description, and all changes which may come within the meaning and range of equivalency of the claims are therefore intended to be embraced therein.

What I claim and desire to secure by Letters Patent is:

1. The process of producing a three-dimensional pictograph, comprising carving in reverse the rear wall of a thick sheet of transparent material with the representation of a pictorial background; thereafter continuing to carve in reverse said wall more deeply and to superimpose upon said representation the representation of an object; then coloring each of said representations to distinguish one from the other, and thereupon forming a complete picture in stereoscopic relief.

2. The process of producing a three-dimensional pictograph, comprising carving in reverse the rear wall of a thick sheet of methyl methacrylate with the representation of a pictorial background thereafter continuing to carve in reverse said wall more deeply and to superimpose upon said representation the representation of an object; then coloring with oil paint each of said representations to distinguish one from the other, and thereupon forming a complete picture in stereoscopic relief.

3. The subject matter of claim 2, including mounting said sheet upon a dark planar backing sheet, and providing a light for illuminating the pictograph.

4. The process of producing a three-dimensional pictograph, comprising deeply carving in reverse the rear wall of a thick sheet of methyl methacrylate with the representation of an object thereafter continuing to carve in reverse said wall more deeply and to superimpose upon said representation the representation of another object; then coloring with oil paint each of said representations to distinguish one from the other, and thereupon forming a complete picture in stereoscopic relief.

5. The process of producing a three-dimensional pictograph, comprising carving in reverse the rear wall of a thick sheet of methyl methacrylate with the representations of a number of objects thereafter continuing to carve in reverse said wall more deeply, and forward of said representations and dominating the same, another pictorial representation of an object; then coloring with oil paint each of said representations to distinguish one from the others, and thereupon forming a complete picture in stereoscopic relief.

6. In a three-dimensional pictograph, the combination of a thick sheet of transparent material, the rear wall of which is carved in reverse with the representation of a pictorial background, and superimposed thereon, and further and more deeply carved therein in reverse, is the representation of an object, said representations being colored to distinguish one from the other; a planar opaque backing affixed to the said first mentioned sheet and means for illuminating said sheet.

7. In a three-dimensional pictograph, the combination of a thick sheet of methyl methacrylate, the rear wall of which is carved, in reverse with the representation of a pictorial background, an object, and superimposed thereon and further and more deeply carved therein in reverse, is the representation of another object, said representations being colored with oil paint to distinguish one from the other; a planar opaque backing affixed to the said first mentioned sheet and means for illuminating said sheet.

8. In a three-dimensional pictograph, the combination of a thick sheet of methyl methacrylate, the rear wall of which is carved in reverse with the representation of an object, and superimposed thereon and further and more deeply carved therein in reverse, is the representation of another object, said representations being colored with oil paint to distinguish one from the other; a planar opaque backing affixed to the said first mentioned sheet and means for illuminating said sheets.

9. The process of producing a three-dimensional pictograph, comprising carving in reverse the rear wall of a thick sheet of methyl methacrylate with the representation of a pictorial background; thereafter continuing to carve in reverse said wall more deeply and to superimpose upon said representation the representation of an object, and thereupon forming a complete picture in stereoscopic relief.

10. The process of producing a three-dimensional pictograph, comprising deeply carving in reverse the rear wall of a thick sheet of methyl methacrylate with the representation of an object thereafter continuing to carve in reverse said wall more deeply and to superimpose upon said representation the representation of another object; and thereupon forming a complete picture in stereoscopic relief.

11. In a three-dimensional pictograph, the combination of a thick sheet of methyl methacrylate, the rear wall of which is carved, in reverse with the representation of a pictorial background, an object, and superimposed thereon, and further and more deeply carved therein in reverse, is the representation of another object; a planar opaque backing affixed to the said first mentioned sheet and means for illuminating said sheet.

References Cited in the file of this patent

UNITED STATES PATENTS 1,790,531     Bethlem _____ Jan. 27, 1931

OTHER REFERENCES

Walton: Popular Science, August 1947, pages 160–164.